United States Patent
Doppalapudi

(10) Patent No.: US 9,529,652 B2
(45) Date of Patent: Dec. 27, 2016

(54) TRIAGING COMPUTING SYSTEMS

(71) Applicant: salesforce.com, inc., San Francisco, CA (US)

(72) Inventor: Raghu Chaitanya Doppalapudi, Pacifica, CA (US)

(73) Assignee: salesforce.com, inc., San Francisco, CA (US)

( * ) Notice: Subject to any disclaimer, the term of this patent is extended or adjusted under 35 U.S.C. 154(b) by 133 days.

(21) Appl. No.: 14/535,550

(22) Filed: Nov. 7, 2014

(65) Prior Publication Data

US 2015/0127979 A1 May 7, 2015

Related U.S. Application Data

(60) Provisional application No. 61/901,213, filed on Nov. 7, 2013.

(51) Int. Cl.
*G06F 11/00* (2006.01)
*G06F 11/07* (2006.01)
*G06F 11/14* (2006.01)
*G06F 11/34* (2006.01)
*G06F 11/30* (2006.01)

(52) U.S. Cl.
CPC ....... *G06F 11/0709* (2013.01); *G06F 11/0715* (2013.01); *G06F 11/0793* (2013.01); *G06F 11/0781* (2013.01); *G06F 11/1402* (2013.01); *G06F 11/302* (2013.01); *G06F 11/3006* (2013.01); *G06F 11/3055* (2013.01); *G06F 11/3409* (2013.01); *G06F 11/3476* (2013.01)

(58) Field of Classification Search
CPC . G06F 11/0709; G06F 11/079; G06F 11/0769; G06F 11/0781; G06F 117/0793; G06F 11/1402
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

*Primary Examiner* — Charles Ehne
(74) *Attorney, Agent, or Firm* — Lorenz & Kopf LLP

(57) ABSTRACT

Methods and systems are provided for automatically triaging a server cluster of the type including a plurality of linked servers each running a plurality of processes. The method includes: detecting at least one failed process; automatically transmitting an electronic alert message embodying a first error code indicative of the failed process to a unified triage module including a processor and an updatable index table; applying, by the processor, the first error code to the index table. If a matching error code corresponding to the first error code is found in the index table, retrieving a solution code from the index table associated with the matching error code and automatically restarting the failed process using the solution code without human intervention.

20 Claims, 5 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,550,019 B1* | 4/2003 | Ahrens .............. G06F 11/0727 713/1 |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,898,733 B2* | 5/2005 | Parks ................ G06F 11/0715 714/15 |
| 7,062,502 B1 | 6/2006 | Kesler |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,895,470 B2* | 2/2011 | Nastacio ............. G06F 11/0709 714/25 |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,312,323 B2* | 11/2012 | Gokhale ............. G06F 11/0709 714/31 |
| 8,453,027 B2* | 5/2013 | Bartz ................. G06F 11/0709 714/746 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,938,644 B2* | 1/2015 | Clark ................. G06F 11/0727 707/718 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |

\* cited by examiner

TRIAGING COMPUTING SYSTEMS

CROSS-REFERENCE TO RELATED APPLICATION

This application claims the benefit of U.S. provisional patent application Ser. No. 61/901,213 filed Nov. 7, 2013, the entire contents of which are incorporated herein by this reference.

TECHNICAL FIELD

Embodiments of the subject matter described herein generally relate to triaging the performance of computer systems and applications, and more particularly to a machine learning algorithm for automatically aggregating error logs and proposing solutions based on previous errors.

BACKGROUND

Software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application feature software s between multiple sets of users.

Conventional techniques for triaging computer performance include generating error alerts using IT infrastructure monitoring tools such as Nagios™ (available at www.nagios.org), and capturing real time data logs for generating dashboard visualizations using analysis tools such as Splunk™ (available at www.splunk.com). Presently known approaches are tedious and cumbersome, particularly for large server clusters, due to the number of routine errors which must be manually attended to by site operators.

Systems and methods are thus needed which overcome these shortcomings.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to systems and methods for automatically triaging database server clusters.

Figure 1:
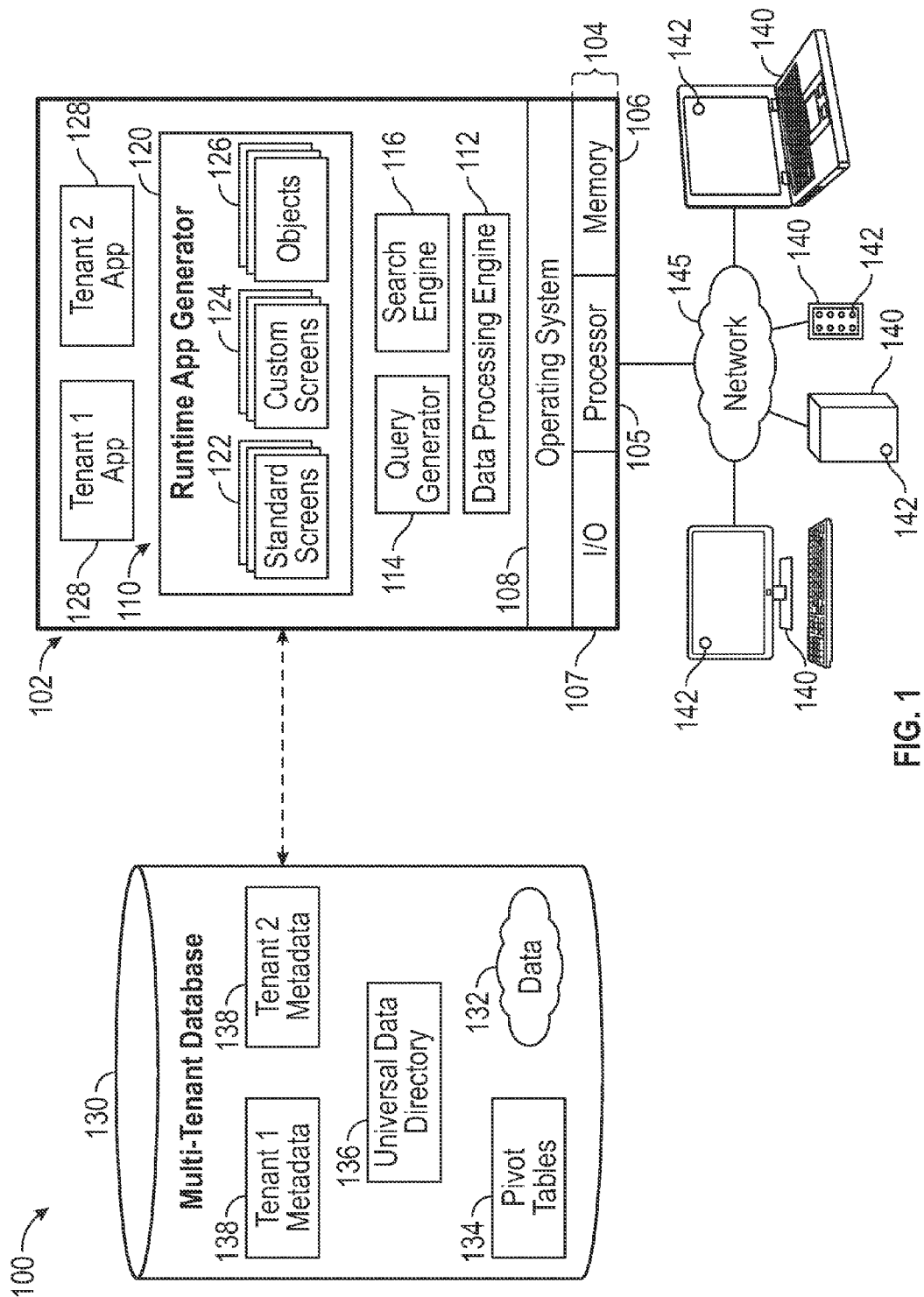
FIG. 1 is a schematic block diagram of a multi-tenant computing environment in accordance with an embodiment.

Turning now to FIG. 1, an exemplary cloud based solution may be implemented in the context of a multi-tenant system 100 including a server 102 that supports applications 128 based upon data 132 from a database 130 that may be shared between multiple tenants, organizations, or enterprises, referred to herein as a multi-tenant database. Data and services generated by the various applications 128 are provided via a network 145 to any number of client devices 140, such as desk tops, laptops, tablets, smartphones, Google Glass™, and any other computing device implemented in an automobile, aircraft, television, or other business or consumer electronic device or system, including web clients.

In addition to the foregoing "dedicated" syncing clients, the present disclosure also contemplates the automatic sharing of data and files into applications, such as Microsoft Word™, such that saving a document in Word would automatically sync the document to the collaboration cloud. In an embodiment, each client device, application, or web client is suitably configured to run a client application 142, such as the Chatterbox file synchronization module or other application for performing similar functions, as described in greater detail below.

An alternative vector into the automatic syncing and sharing may be implemented by an application protocol interface (API), either in lieu of or in addition to the client application 142. In this way, a developer may create custom applications/interfaces to drive the sharing of data and/or files (and receive updates) with the same collaboration benefits provided by the client application 142.

Each application 128 is suitably generated at run-time (or on-demand) using a common application platform 110 that securely provides access to the data 132 in the database 130 for each of the various tenant organizations subscribing to the service cloud 100. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing.

As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

Triaging computer performance can be tedious because the operations staff needs to look into data from different sources to come to a conclusion about how to respond to a performance problem, such as viewing log files, monitoring data, and responding to alerts. Accordingly, it is desirable to provide techniques that enable the unification of triaging data and actions based on the unified triaging data.

A system is provided which identifies alert data associated with a performance of a computer. For example, the system recognizes an alert about a failure of a production computer. The system collects log data associated with the alert data. For example, the system starts collecting the logs around the time of the alert. The system plots graphs based on monitoring data associated with the alert data. For example, the system plots graphs for the monitoring data metrics collected relevant to the failure. The system displays unified triaging data via a user interface, wherein the unified triaging data comprises the alert data, the log data, and the graphs based on the monitoring data. For example, the system displays the unified triaging on a dashboard for the operations staff, who can determine if the problem can be triaged easily and can ascertain the fix that needs to be applied to resolve the issue. In addition, the system may identify various metrics including the category and severity level of the alert, and attach information relating to other failures previously triaged for similar metrics. In this way, the system "learns" how to more effectively triage failures based on previous triaging experience.

The system creates an action request based on the unified triaging data. For example, the system creates a repair ticket and attaches the details about the alert, logging information, and metrics plots. The system identifies a historical action request based on a similarity of the historical action request to the current action request. For example, because the system already captured unified triaging data and responsive actions for previous repair tickets, the system can compare the current repair ticket to previous repair tickets to determine if a previous repair ticket exists with unified triaging data that is sufficiently similar to the unified triaging data for the current repair ticket.

The system executes an action, which is associated with the historical action request, to address the current performance error. For example, the system self-services the computer based on taking the same corrective action that addressed a similar error in the past. The system collects the data needed by the operations staff to triage the issue, without the operations staff having to request the data, thereby facilitating more time efficient triaging. The system also includes a learning algorithm to enable the system to provide self-service from an updatable knowledge base.

Figure 2:
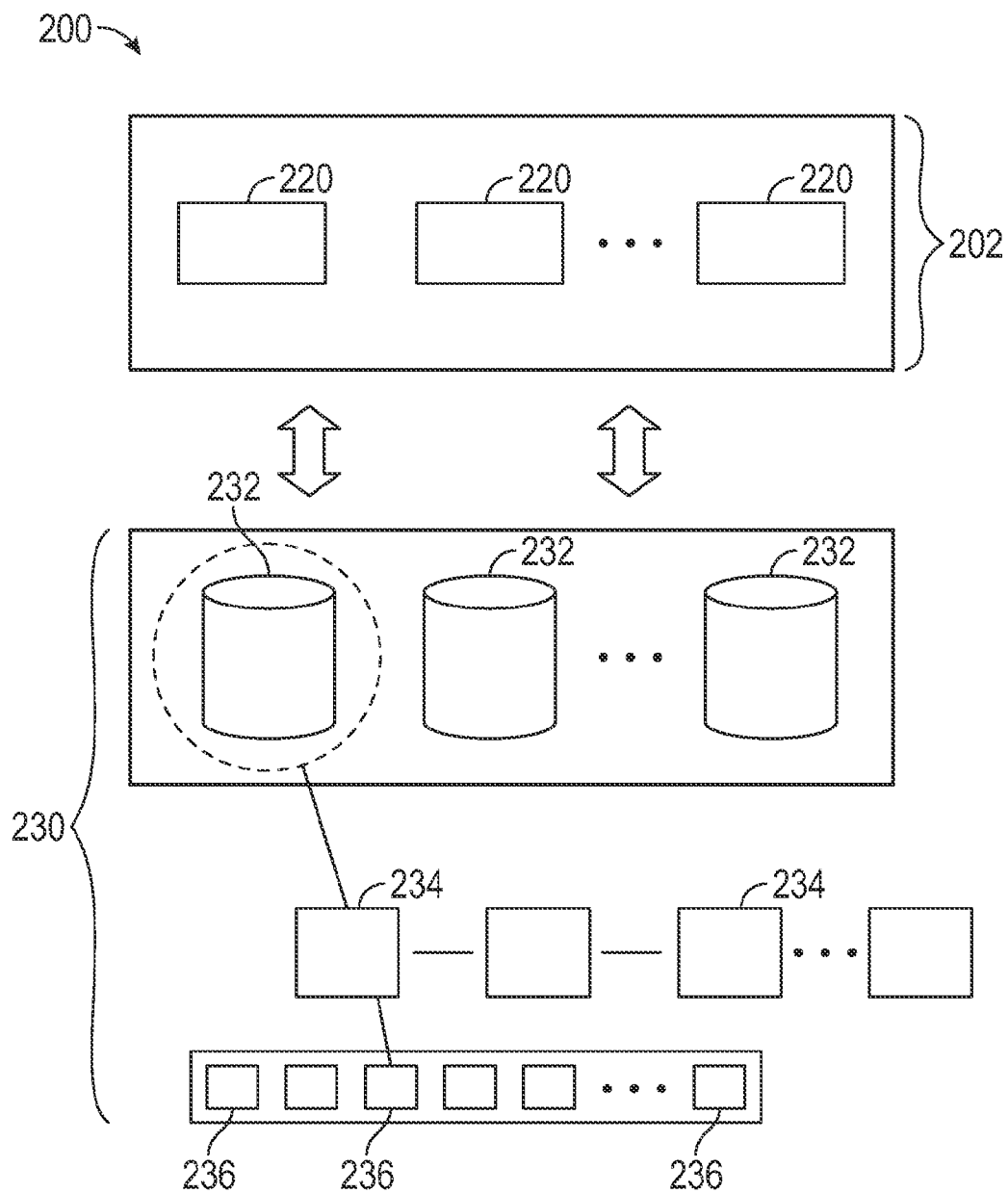
FIG. 2 is a block diagram of a core application server and a database useful in a multi-tenant computing environment in accordance with an embodiment.

FIG. 2 is a block diagram of an exemplary distributed computer architecture 200 for processing core applications and storing the processed data in an on-demand computing environment. Those skilled in the art will appreciate, however, that the unified triaging systems and techniques described herein may also be employed outside the context of an on-demand computing environment.

More particularly, the distributed computer architecture 200 includes an application server 202 (generally analogous to server 102 of FIG. 1) having a plurality of individual machines 220, and a database 230 (generally analogous to database 130 of FIG. 1). The application server 202 is configured to run an organization's core applications such as, for example, a customer relationship management (CRM) application serving multiple customer requests 204 via the internet, an intranet, or any other suitable network 206. The database 230 manages the storage and retrieval of data objects processed by the application servers.

With continued reference to FIG. 2, the database 230 includes a plurality (e.g., 90) of horizontally scalable server clusters 232, each including a plurality (e.g., 25) of individual machine 234. Each machine 234, in turn, is configured to run a plurality (e.g., 11) of database applications or processes 236. When one or more of the processes 236 on one or more of the machines 234 crashes or otherwise experiences a disruption, the site operator is notified to triage and fix the error(s), whereupon the "down" process is restarted.

Figure 3:
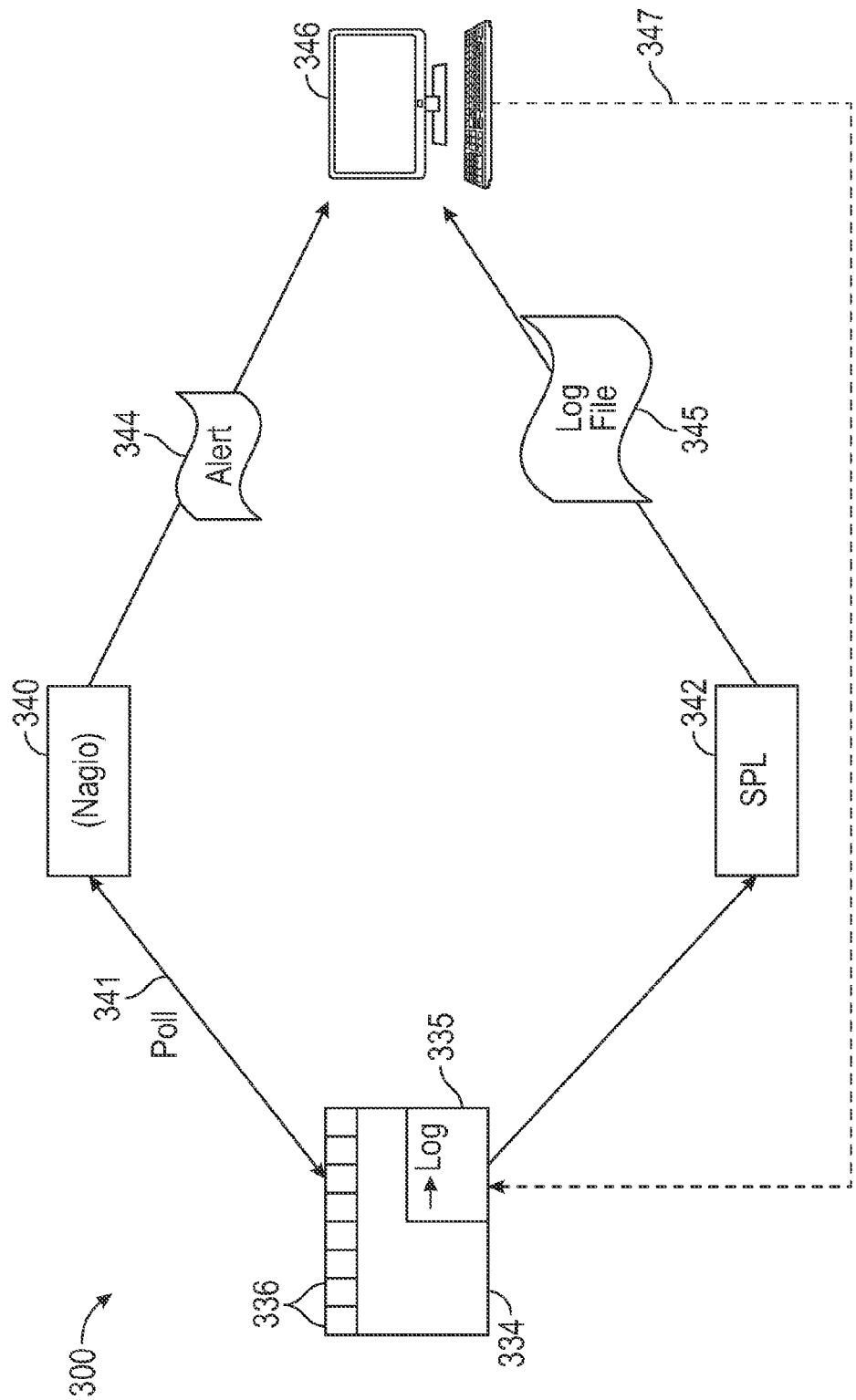
FIG. 3 is a schematic diagram of a prior art manual triaging system.

FIG. 3 is a schematic diagram of a prior art manual triaging system 300 including a database server machine 334 (generally analogous to the machine 234 of FIG. 2) configured to run a plurality of processes 336 (generally analogous to processes 236 of FIG. 2), an alert module 340, an analytics module 342, and a user interface 346. The machine 334 includes a log module 335 configured to maintain a log of relevant activity including commands, I/Os, error codes, and the like. The analytics module 342 captures, indexes, and correlates real time data from the log module 335, and can generate graphs, reports, and dashboard visualizations based on the logged data (collectively referred to as the "log file" 345) to facilitate triaging, as explained in greater detail below.

With continued reference to FIG. 3, the alert module 340 is configured to monitor the processes 336 run by machine 334, typically through the use of a polling protocol 341. When a process 336 crashes or is otherwise interrupted, the polling or other monitoring protocol determines that an error has occurred, and the alert module 340 generates an alert 344 (also referred to as a ticket), for example, in the form of an email message sent to the user interface 346.

Upon receipt of an email or other form of alert 344, the site operator may call up the log file from the analytics module 342. Triaging the error typically involves viewing the log file data, for example, through a text editor, and analyzing the problem using the error codes and time stamp information contained in the alert 344. Due to the inherent latency associated with retrieving log data and providing a log file to the user interface 346, the site operator may need to access the log data directly (via a remote connection 347) from the machine 334, for example, when time is of the essence. The foregoing process can be cumbersome and time consuming, particularly when multiple processing errors occur on one or more machines simultaneously.

Figure 4:
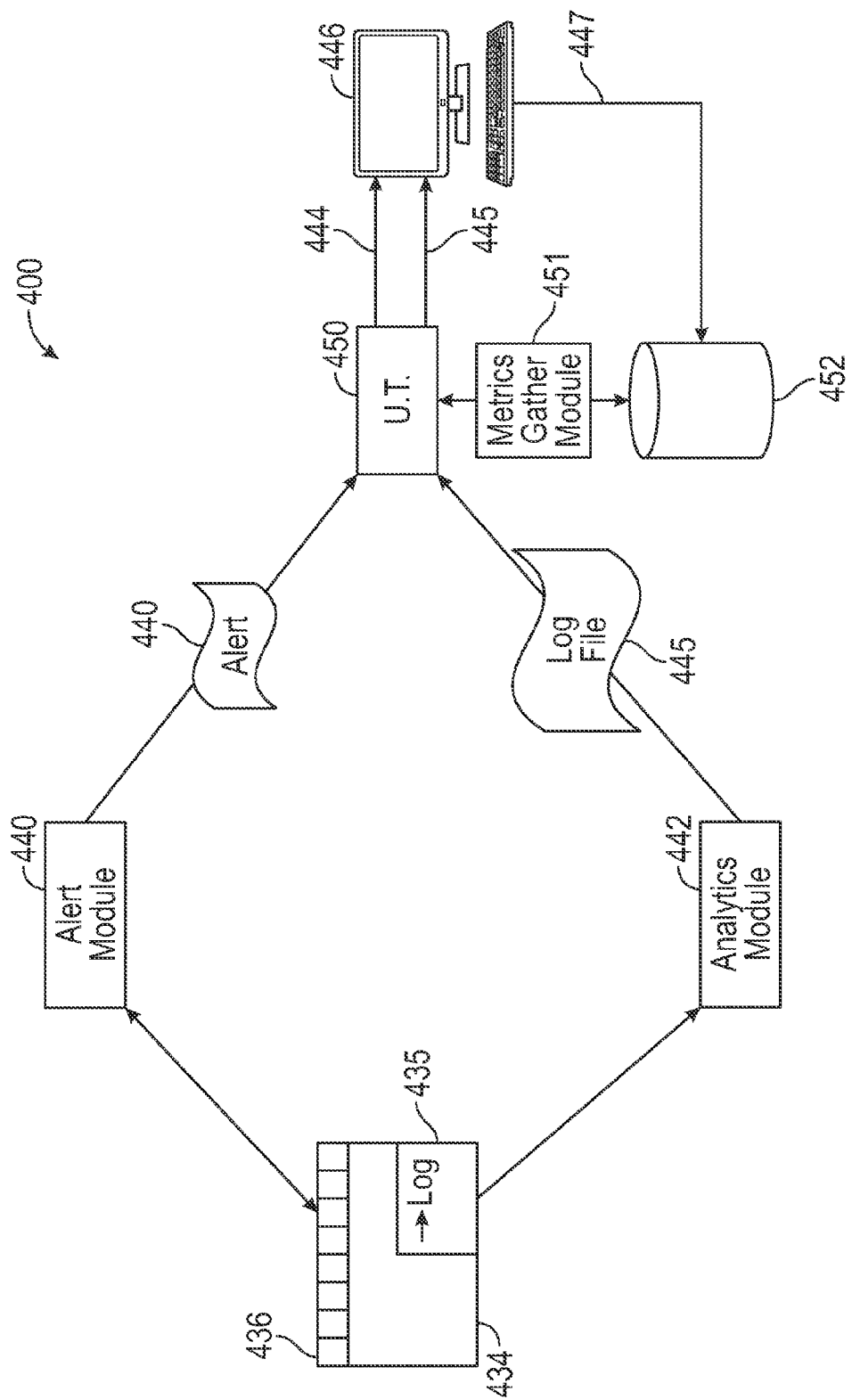
FIG. 4 is a schematic diagram of an automatic unified triaging system including a machine learning component in accordance with an embodiment.

FIG. 4 is a schematic diagram of an automatic unified triaging architecture 400 including a machine learning component in accordance with various embodiments. More particularly, architecture 400 includes a database server machine 434 having a log module 435 and configured to run a plurality of processes 436, an alert module 440 configured to generate an alert 444, an analytics module 442 configured to generate a log file 445, and a user interface 446, all generally analogous to the components and functions shown and described in connection with the triaging architecture 300 of FIG. 3. Unlike the triaging architecture 300, however, the triaging architecture 400 includes a unified triaging (UT) module 450, a metrics gathering module (also referred to as a learning module) 451, and an updatable historical database table 452 which includes archival data for previous errors and associated solutions. Together, the UT module 450, learning module 451, and the table 452 implement a machine learning algorithm which gathers metrics from previous failures and related fixes, and allows the triaging architecture 400 to automatically fix many routine errors without requiring human intervention.

More particularly and with continued reference to FIG. 4, in response to the detection of an error in executing one or more processes 436 by one or more machines 434, the alert module 440 transmits the alert 444 directly to the UT module 450. Based on the information contained in the alert including the identity of the cluster(s), machine(s), and process(es) requiring attention, associated time stamp information, and the category and severity level of the alert, UT 450 calls up or otherwise retrieves the appropriate log file(s) 445. In addition, the learning module 451 interrogates table 452 to determine if the same or a similar error has previously been encountered and, if so, retrieves the same solution previously employed and provides that information to UT 450. If the proposed solution is successful, the ticket may be closed and the table 452 updated to reflect the successful fix. If UT 450 determines that the current error has not been previously encountered or, alternatively, if the proposed solution does not fix the problem, the alert 444 and log file 445 are passed to the user interface 446 for manual intervention. Once resolved, the table 452 may be manually updated 447 to reflect the error and solution so that this information may be "learned" for future use.

Figure 5:
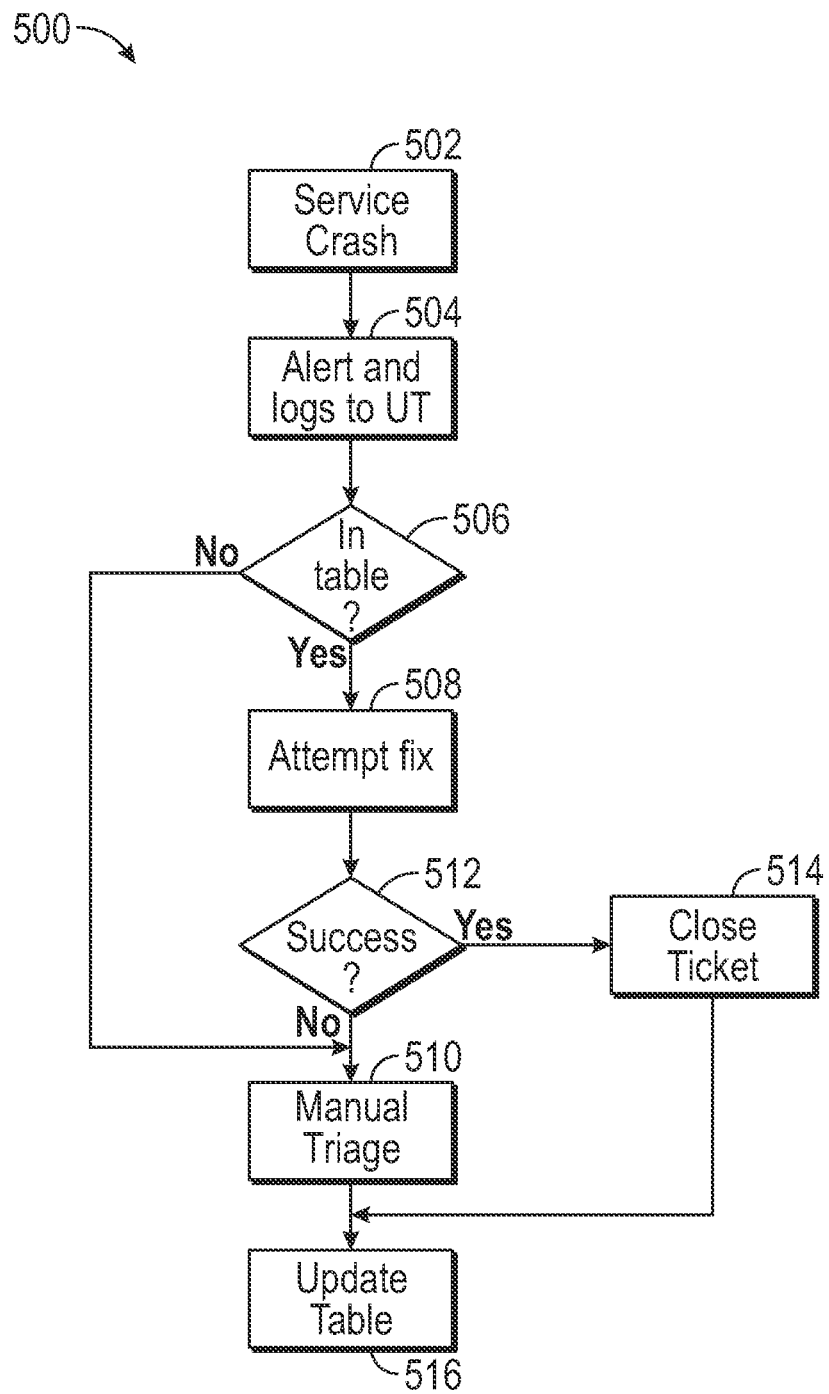
FIG. 5 is a flow diagram of an exemplary automated unified triaging method using machine learning techniques in accordance with an embodiment.

FIG. 5 is a flow diagram of an exemplary automated unified triaging method 500 including machine learning techniques in accordance with various embodiments. The method 500 includes detecting (Task 502) a service failure event and, in response, sending (Task 504) an alert to a smart unified triage module. The UT module determines (Task 506) whether the problem has previously been fixed by the system, for example, by capturing metrics from the alert such as an error category and severity level and interrogating a database of previous triage solutions. If the problem has previously been encountered ("Yes" branch from Task 506), the system attempts to restart or otherwise fix the failed process using the previously employed solution (Task 508). If the problem has not been previously solved ("No" branch from Task 506), the system forwards the alert and log file to a human interface for manual triaging by the site staff (Task 510).

With continued reference to FIG. 5, the method 500 further includes determining (Task 512) if the proposed solution fixed the problem. If the proposed solution fixes the error or otherwise restarts the failed process ("Yes" branch from Task 512), or if the manual triage (Task 510) resolves the issue, the service ticket may be closed (Task 514) and the error/solution index (generally corresponding to table 452) updated accordingly (Task 516), thereby allowing the system to learn from experience and to leverage that knowledge in future triaging.

Although various embodiments are set forth in the context of a multi-tenant or on-demand environment, the systems and methods described herein are not so limited. For example, the may also be implemented in enterprise, single tenant, and/or stand-alone computing environments.

A method is thus provided for triaging a server cluster of the type including a plurality of linked servers each running a plurality of processes. The method includes: detecting at least one failed process; automatically transmitting an electronic alert message embodying a first error code indicative of the failed process to a unified triage module including a processor and an updatable index table; applying, by the processor, the first error code to the index table; if a matching error code corresponding to the first error code is found in the index table, retrieving a solution code from the index table associated with the matching error code; and automatically restarting the failed process using the solution code without human intervention.

In an embodiment, the method also includes: in response to detecting the failed process: automatically retrieving a log file associated with the failed process; and electronically transmitting the log file to the unified triage module.

In an embodiment, the log file includes operational data temporally coincident with the failed process, where temporally coincident may correspond to a predetermined time range surrounding the failure event associated with the failed process.

In an embodiment, temporally coincident corresponds to a predetermined time range surrounding the failure event associated with the failed process such as, for example, approximately one hour before and one hour after the failure event.

In an embodiment, the alert message further embodies indicia of: i) the failed process; ii) the linked server running the failed process; and iii) the cluster to which the linked server belongs.

In an embodiment, the method also includes: if a matching error code corresponding to the first error code is not found in the index table, transmitting the alert message and the log file to a user interface of the type configured to facilitate manually triaging the failed process.

In an embodiment, the method also includes updating the index table to reflect the result of the manual triaging.

In an embodiment, the log file comprises at least one of a graph, a report, and a dashboard visualization relating to the failed process.

In an embodiment, the updatable index table comprises a plurality of objects each corresponding to a previously failed process and a corresponding solution.

In an embodiment, detecting comprises simultaneously monitoring the plurality of processes by periodically polling each of the plurality of linked servers.

A processing system is also provided for triaging failures in an on-demand computing environment. The processing system includes: a database system configured to run a plurality of storage processes and to record associated log data; a unified triage (UT) module that includes an index table and a set of proposed solutions to one or more failed storage processes, the index table configured to identify the one or more proposed solutions; a monitoring module configured to listen to the database system and to detect a failed storage process, the monitoring module further configured to transmit a corresponding alert to the UT module when a failed storage process is detected; and an analytics module connected to the database system and configured to generate a log file based on the log data, and to transmit the log file to the UT module upon receipt by the UT module of the alert; wherein the UT module is configured to retrieve a proposed solution when it receives the alert from the monitoring module, wherein the proposed solution is retrieved based on data stored in the log file and by using solution from the index table to access a corresponding solution In an embodiment, the UT module is further configured to restart the failed storage process using the proposed solution.

In an embodiment, the processing also includes a user interface configured to facilitate manual triaging of the failed storage process.

In an embodiment, the UT module is further configured to electronically transmit the alert and the log file to the user interface if the index table does not contain a proposed solution.

In an embodiment, the user interface is further configured to update the index table to reflect successful manual triaging of the failed storage process.

In an embodiment, the user interface is further configured to display at least one of at least one of a graph, a report, and a dashboard visualization relating to the failed storage process based on the log file.

In an embodiment, the wherein the updatable index table comprises a plurality of objects each corresponding to a previously failed storage process and a corresponding solution.

Computer code embodied in a non-transitory medium is also provided for operation by a processor for performing the steps of: detecting a failed process in a server cluster of the type including a plurality of linked servers; automatically transmitting an electronic alert message and a log file each corresponding to the failed process to a unified triage module; searching an index table for a solution to the failed process; if a solution is found in the index table, automatically restarting the failed process using the solution; if a solution is found in the index table, transmitting the alert message and the log file to a user interface for manually triaging the failed process; and updating the index table using the unified triage module to reflect the results of the manual triaging.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed:

1. A method of operating a server cluster of the type including a plurality of linked servers each running a plurality of processes, the method comprising:
   detecting at least one failed process;
   automatically transmitting an electronic alert message embodying a first error code indicative of the failed process to a unified triage module including a processor and an updatable index table, wherein the alert message identifies the at least one failed process and the linked server running the at least one failed process;
   applying, by the processor, the first error code to the index table;
   if a matching error code corresponding to the first error code is found in the index table, retrieving a solution code from the index table associated with the matching error code; and
   automatically restarting the failed process using the solution code without human intervention.

2. The method of claim 1, further comprising:
   in response to detecting the failed process:
      automatically retrieving a log file associated with the failed process; and
      electronically transmitting the log file to the unified triage module.

3. The method of claim 2, wherein the log file comprises operational data temporally coincident with the failed process.

4. The method of claim 3, wherein temporally coincident corresponds to a predetermined time range surrounding the failure event associated with the failed process.

5. The method of claim 4, wherein temporally coincident corresponds to a predetermined time range surrounding the failure event associated with the failed process.

6. The method of claim 5, wherein the predetermined time range includes approximately one hour before and one hour after the failure event.

7. The method of claim 1, wherein the alert message further identifies the cluster to which the linked server belongs.

8. The method of claim 2, further comprising:
   if a matching error code corresponding to the first error code is not found in the index table, transmitting the alert message and the log file to a user interface of the type configured to facilitate manually triaging the failed process.

9. The method of claim 8, further comprising:
   updating the index table to reflect the result of the manual triaging.

10. The method of claim 8, wherein the log file comprises at least one of a graph, a report, and a dashboard visualization relating to the failed process.

11. The method of claim 1, wherein the updatable index table comprises a plurality of objects each corresponding to a previously failed process and a corresponding solution.

12. The method of claim 1, wherein detecting comprises simultaneously monitoring the plurality of processes by periodically polling each of the plurality of linked servers.

13. A processing system for triaging failures in an on-demand computing environment, comprising:
   a database system configured to run a plurality of storage processes and to record associated log data;
   a unified triage (UT) module that includes an index table and a set of proposed solutions to one or more failed storage processes, the index table configured to identify the one or more proposed solutions;

a monitoring module configured to listen to the database system and to detect a failed storage process, the monitoring module further configured to transmit a corresponding alert to the UT module when a failed storage process is detected; and an analytics module connected to the database system and configured to generate a log file based on the log data, wherein the log file comprises operational data temporally coincident with the failed storage process, and to transmit the log file to the UT module upon receipt by the UT module of the alert;

wherein the UT module is configured to retrieve a proposed solution when it receives the alert from the monitoring module, wherein the proposed solution is retrieved based on data stored in the log file and by using solution from the index table to access a corresponding solution.

14. The processing system of claim 13, wherein the UT module is further configured to restart the failed storage process using the proposed solution.

15. The processing system of claim 13, further comprising a user interface configured to facilitate manual triaging of the failed storage process.

16. The processing system of claim 15, wherein the UT module is further configured to electronically transmit the alert and the log file to the user interface if the index table does not contain a proposed solution.

17. The processing system of claim 16, wherein the user interface is further configured to update the index table to reflect successful manual triaging of the failed storage process.

18. The processing system of claim 16, wherein the alert transmitted to the UT module identifies the failed storage processes and one of a plurality of linked servers running the failed storage process.

19. The processing system of claim 10, wherein the updatable index table comprises a plurality of objects each corresponding to a previously failed storage process and a corresponding solution.

20. A non-transitory computer readable medium comprising computer readable instructions that, when executed by a processor, perform the steps comprising:

detecting a failed process in a server cluster of the type including a plurality of linked servers;

automatically transmitting an electronic alert message and a log file each corresponding to the failed process to a unified triage module, wherein the electronic alert message identifies the failed process and the linked server running the failed process;

searching an index table for a solution to the failed process;

if a solution is found in the index table, automatically restarting the failed process using the solution;

if a solution is found in the index table, transmitting the alert message and the log file to a user interface for manually triaging the failed process; and updating the index table using the unified triage module to reflect the results of the manual triaging.

* * * * *